(12) United States Patent
Hsiao

(10) Patent No.: US 8,241,048 B2
(45) Date of Patent: Aug. 14, 2012

(54) SIGNAL TRANSMISSION DEVICE

(75) Inventor: Jen Hung Hsiao, New Taipei (TW)

(73) Assignee: Ability Enterprise Co., Ltd., Taipei (TW)

( * ) Notice: Subject to any disclaimer, the term of this patent is extended or adjusted under 35 U.S.C. 154(b) by 0 days.

(21) Appl. No.: 13/114,972

(22) Filed: May 24, 2011

(65) Prior Publication Data

US 2012/0156908 A1 Jun. 21, 2012

(30) Foreign Application Priority Data

Dec. 17, 2010 (TW) .............................. 99144375 A

(51) Int. Cl.
*H01R 13/44* (2006.01)
(52) U.S. Cl. ...................................................... 439/135
(58) Field of Classification Search .................. 439/135, 439/164, 15, 131
See application file for complete search history.

(56) References Cited

U.S. PATENT DOCUMENTS

| | | | |
|---|---|---|---|
| 7,295,431 B2* | 11/2007 | Chuang | 361/679.55 |
| D652,046 S * | 1/2012 | Belan | D14/480.6 |
| 2008/0227380 A1* | 9/2008 | Hsu et al. | 454/184 |
| 2010/0075517 A1* | 3/2010 | Ni et al. | 439/131 |
| 2010/0304586 A1* | 12/2010 | Ma | 439/131 |
| 2011/0059636 A1* | 3/2011 | Ni et al. | 439/131 |
| 2012/0015534 A1* | 1/2012 | Wavra et al. | 439/131 |

* cited by examiner

*Primary Examiner* — Tulsidas C Patel
*Assistant Examiner* — Phuongchi Nguyen
(74) *Attorney, Agent, or Firm* — Stout, Uxa, Buyan & Mullins, LLP

(57) ABSTRACT

A signal transmission device is provided. The signal transmission device comprises a linked unit, a switch button, a data connector and a lock fastener. The linked unit includes a first shaft, a second shaft, a first elastomer and a second elastomer. The switch button is attached/disposed on the linked unit. The data connector rotates and expands according to the first shaft and the first elastomer. The lock fastener rotates and moves according to the second shaft and the second elastomer.

20 Claims, 3 Drawing Sheets

SIGNAL TRANSMISSION DEVICE

CROSS-REFERENCE TO RELATED APPLICATIONS

The entire contents of Taiwan Patent Application No. 099144375, filed on Dec. 17, 2010, from which this application claims priority, are incorporated herein by reference.

BACKGROUND OF THE INVENTION

1. Field of the Invention

The present invention generally relates to an elastically extendable signal transmission device, and more particularly to a built-in signal transmission device of a portable electronic apparatus which can be operated to extend out via a button.

2. Description of Related Art

Modern portable electronic apparatus such as digital cameras, digital video cameras, mobile phones, notebook personal computers or tablet personal computers etc. with advantages of light weight, small size, powerful functions and easy to carry are widely used by consumers. Portable electronic apparatus such as digital cameras and digital video cameras usually need additional signal transmission line to connect other electronic apparatus or systems to transmit data such as photographs or video files or to recharge batteries so that users have to carry the additional signal transmission line beside the portable electronic apparatus. Thus it would be impossible to proceed file transfer or battery recharge and it is inconvenient for the user who does not have the additional signal transmission line in hand.

The invention provides an elastically extendable built-in signal transmission device of a portable electronic apparatus which can enable the user to proceed file transfer or battery recharge any time without using any additional signal transmission line and effectively improve the convenience of the usage of the portable electronic apparatus.

SUMMARY OF THE INVENTION

The invention provides an extendable signal transmission device suitable for any portable electronic apparatus which needs additional transmission line to connect other electronic system for data transmission or battery recharge. Through the design of elastically extending out, the user can directly extend the data connector out via a switch button. During the retraction of the data connector, a lock fastener is used to secure and fasten the data connector.

According to the object set forth, one embodiment of the present invention provides a signal transmission device comprising a linked unit, a switch button, a data connector and a lock fastener. The linked unit has a first shaft, a second shaft, a first elastomer and a second elastomer. The switch button is disposed on the linked unit. The data connector rotates and expands according to the first shaft and the first elastomer. The lock fastener rotates and expands according to the second shaft and the second elastomer. When the data connector is retracted in the signal transmission device, the lock fastener secures the data connector, when the switch button is moved by an applied force, the data connector rotates and extends out.

Another embodiment of the present invention provides a portable electronic apparatus comprising a main frame and a signal transmission device in the main frame. The signal transmission device comprises a switch button, a linked unit, a data connector, and a lock fastener. The linked unit has a first shaft, a second shaft, a first elastomer and a second elastomer. The data connector rotates and expands according to the first shaft and the first elastomer. The lock fastener rotates and expands according to the second shaft and the second elastomer. When the data connector is retracted in the signal transmission device, the lock fastener secures the data connector; when the switch button is moved by an applied force, the data connector rotates and extends out.

BRIEF DESCRIPTION OF THE DRAWINGS

The accompanying drawings illustrate various embodiments of the present invention and are a part of the specification. The illustrated embodiments are merely examples of the present invention and do not limit the scope of the invention.

DETAILED DESCRIPTION OF THE INVENTION

The detailed description of the present invention will be discussed in the following embodiments in accordance with corresponding drawings which are not intended to limit the scope of the present invention, and can be adapted for other applications. Beside the detailed description, the invention can be made and performed by other replacements, modified and equivalent embodiments which are included in the scopes of the invention and the claims. In the description of the present invention, a plurality of detailed features are provided to enable one with ordinary skill in the art to make and use the invention. However, the invention can still be performed while some detailed features are omitted. Furthermore, well-known process steps or elements are not described in detail. While drawings are illustrated in detail, it is appreciated that the scale of each component may not be expressly exactly.

The signal transmission device of the invention can be applied to portable electronic apparatuses comprising, but not limited to, handheld PC, personal digital assistant (PDA), MPEG audio player 3 (MP3), global positioning system (GPS), mobile communication devices, digital camera and digital video camera; any electronic apparatus which applies data connectors is included in the scope of the invention.

Figure 1:
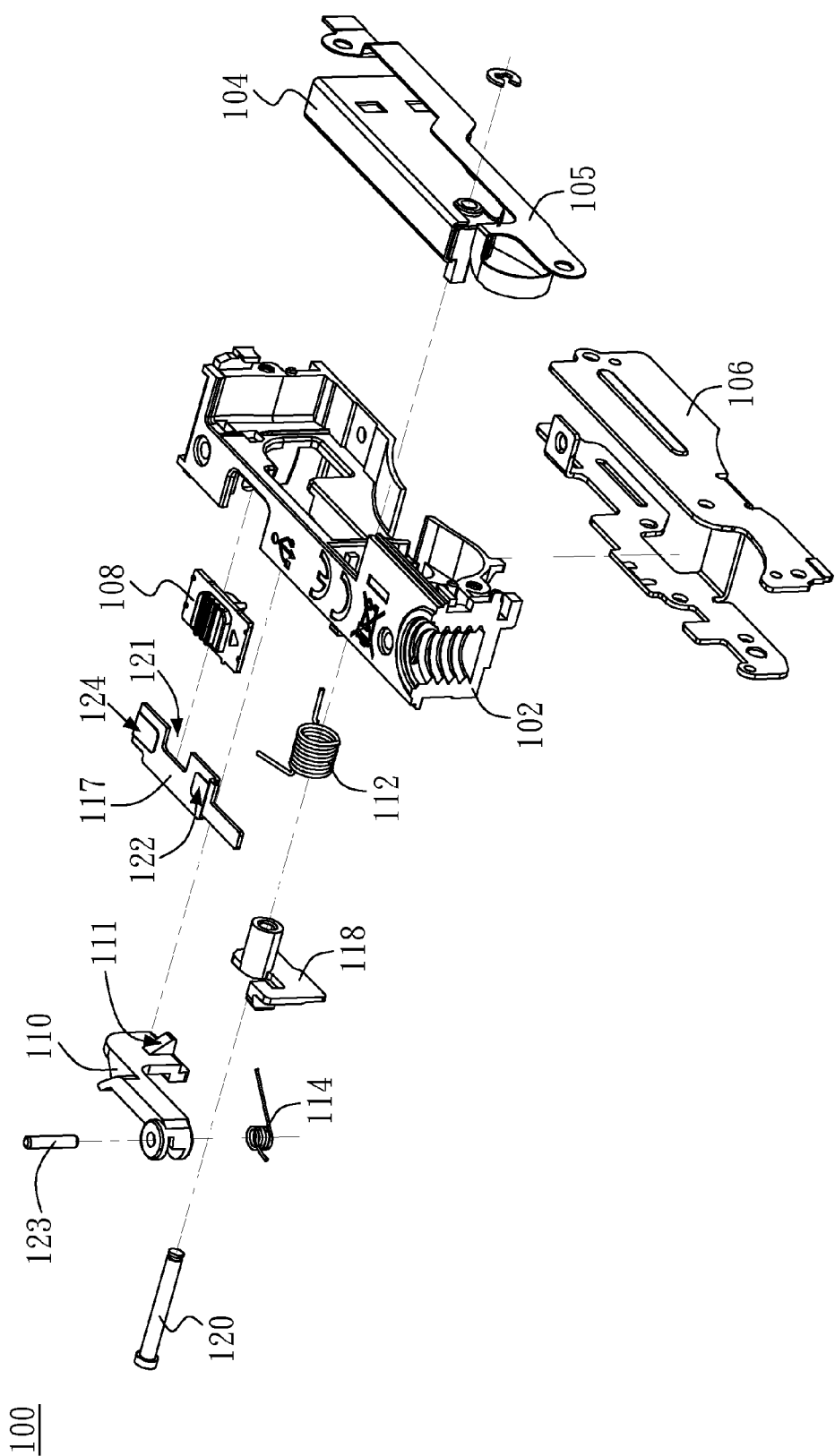
FIG. 1 shows a partial exploded view of a signal transmission device according to one embodiment of the invention.

Referring to FIG. 1, a partial exploded view of a signal transmission device according to one embodiment of the invention is shown. The signal transmission device 100 comprises a main frame 102, a data connector 104, a frame component 106, a switch button 108 and a lock fastener 110. The signal transmission device 100 further comprises a signal circuit 105, elastomers 112, 114 and 116, a securing piece 117, a sheath component 118 and a shaft 120. The data connector 104 includes, but is not limited to, a Universal Serial Bus (USB) data connector or an IEEE 1394 data connector. The signal circuit 105 comprises a flexible printed circuit used to electrically connect to the portable electronic apparatus. The signal transmission device 100 and the main frame of the portable electronic apparatus can be formed as one piece, but is not limited to being formed as one piece. Furthermore, possible image capture system (not shown), signal processing system (not shown), control system (not shown) and data storage system (not shown) may be included in the electronic apparatus.

Referring again to FIG. 1, the main frame 102 and the frame component 106 are secured or assembled to combine with each other. A first rotation axis/shaft is constituted by the sheath component 118, the elastomer 112 and the shaft 120 passing through the sheath component 118 and the elastomer 112. The first rotation axis/shaft is assembled with the data connector 104 and the main frame 102 so that the data connector 104 can rotate and expand out via the elastomer 112 through the first rotation axis/shaft.

As shown in FIG. 1, the securing piece 117 is attached to the main frame 102 and the frame component 106 and the switch button 108 is disposed on the securing piece 117. The securing piece 117 has a track 121 to enable the switch button 108 to move between an original position 122 and an activation position 124 of the track 121. The lock fastener 110 having a hook 111 is disposed in the main frame 102 and beneath the switch button 108 and the securing piece 117. The lock fastener 110 rotates and moves via the elastomer 114 according to a second rotation axis/shaft constituted by the elastomer 114 and a shaft 123 passing through the elastomer 114. The lock fastener 110 is used to fasten and secure the data connector 104. Through the switch button 108 pushing the lock fastener 110, the data connector 104 can be released to expand out.

As shown in FIG. 1, the elastomer 116 is disposed between the switch button 108 and the main frame 102. The switch button 108 will be back to the original position 122 of the securing piece 117 via the elastomer 116 after applied force is removed, wherein the elastomer 116 includes a spring. Particularly, the elastomer 116 applies a pulling force upon the switch button 108 along a direction toward the original position 122 of the track 121. Thus the first rotation axis/shaft and the second rotation axis/shaft, the securing piece 117, the elastomers 112, 114 and 116 constitute a linked unit. It is to be appreciated that some well-known elements of the signal transmission device may be omitted and the components in the figure are not necessarily arranged in the sequence of assembling. The omitted well-known features can be practiced by any related art and anyone with ordinary skill in the art can make and use the invention based on ordinary level of skill in the art.

Figure 2:
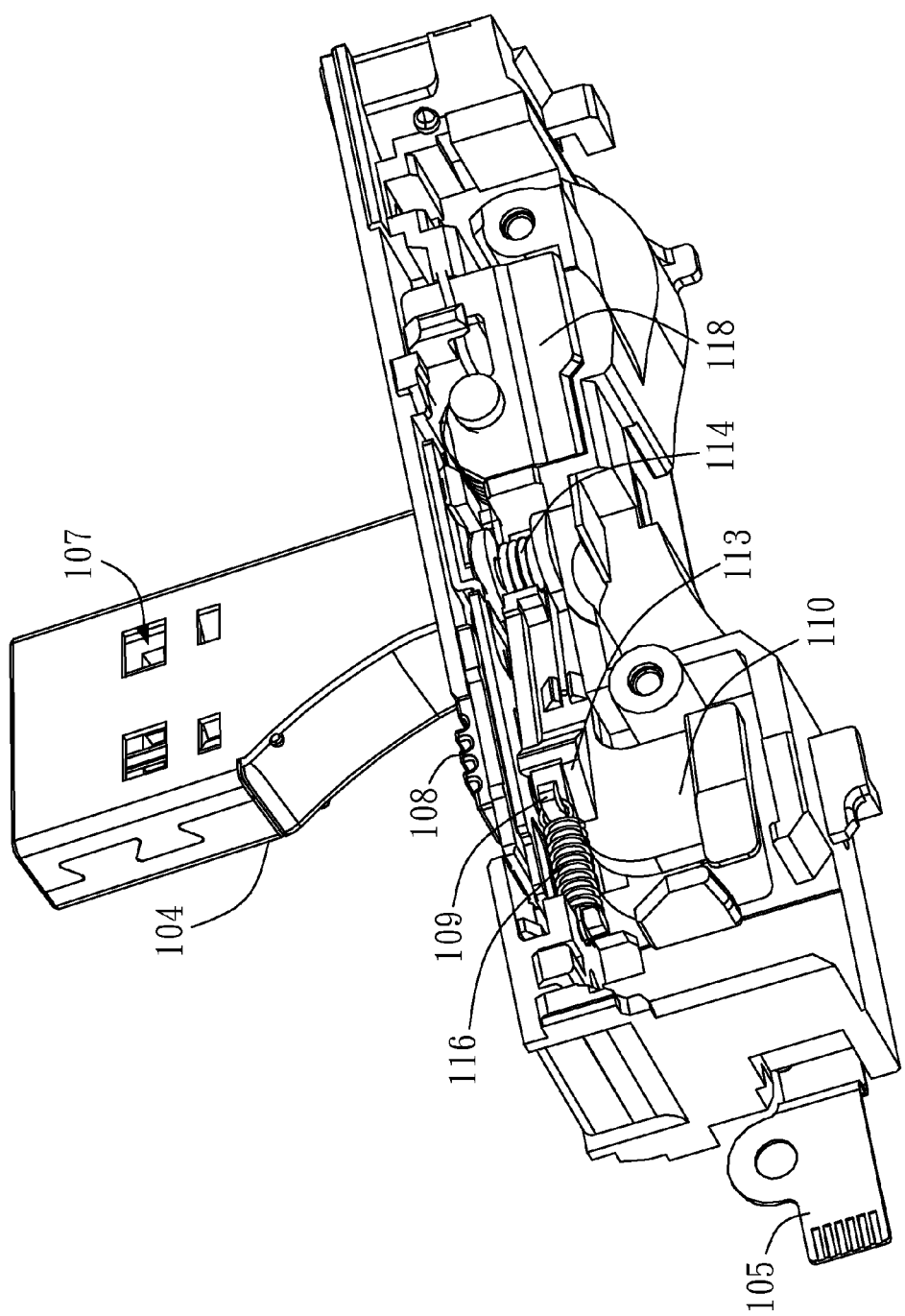
FIG. 2 shows a schematic view of expanding out of the data connector of the signal transmission device according to one embodiment of the invention.

FIG. 2 shows a schematic view of expanding out of the data connector of the signal transmission device according to one embodiment of the invention. When a user wants to use the data connector, through pushing the switch button 108 to move the switch button 108 along the track 121 to the activation position 124, an extension component 109 of the switch button 108 contacting against an incline surface 113 of the lock fastener 110 will push the lock fastener 110 to rotate and move. Then the hook 111 of the lock fastener 110 will move away from an opening 107 of the data connector 104. Thus through the recovery force of the elastomer 112, the data connector 104 can rotate and expand out. Moreover, if the elastomers 112 and 114 are torsion springs, the lock fastener 110 will be back to the position before being pushing by the switch button 108 due to the recovery force of the torsion springs after deformation. The switch button 108 will be back to the original position 122 of the track 121 due to the recovery force of the elastomer 116 after deformation.

Figure 3:
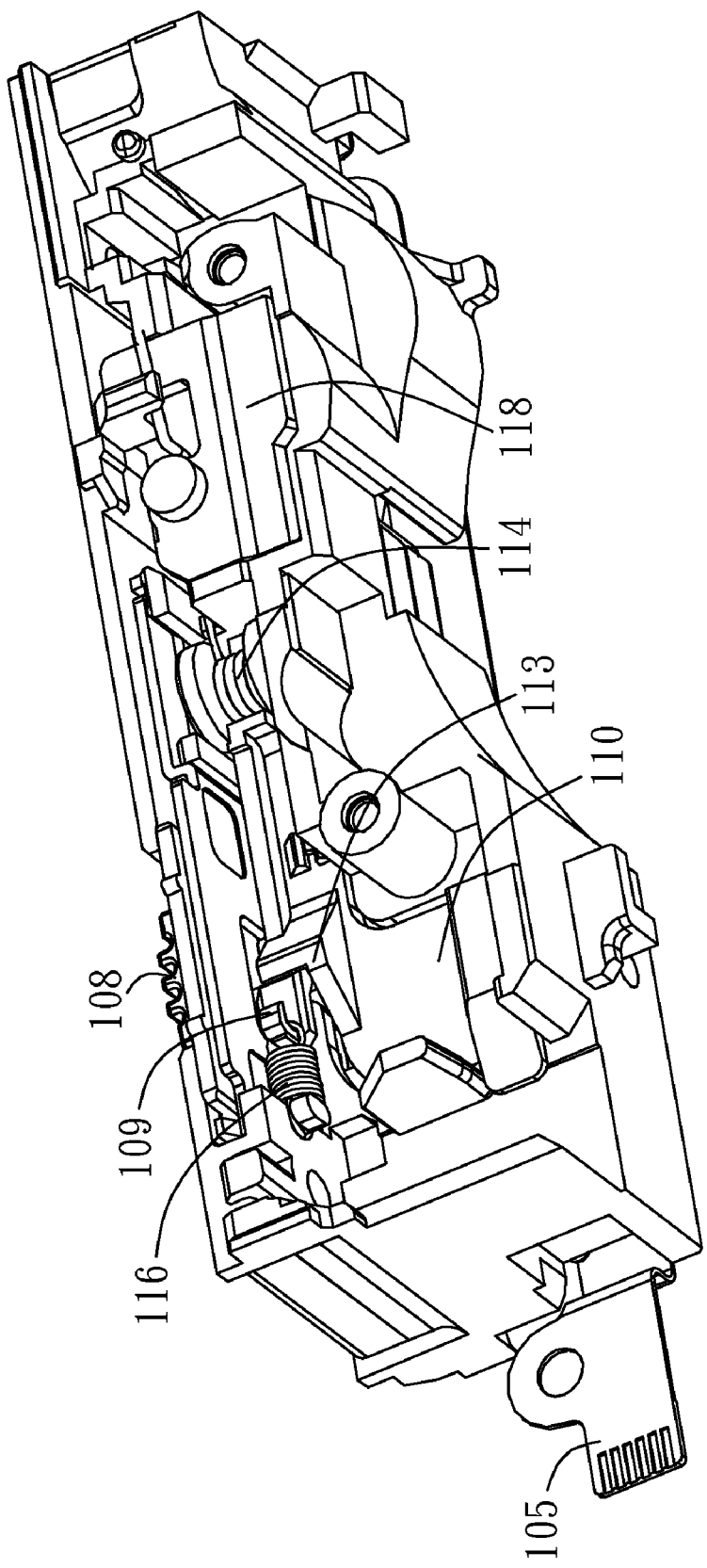
FIG. 3 shows a schematic view of retracting back of the data connector of the signal transmission device according to one embodiment of the invention.

FIG. 3 shows a schematic view of retracting back of the data connector of the signal transmission device according to one embodiment of the invention. When the user presses the data connector 104 to retract the data connector 104, the data connector 104 will rotate according to the first rotation axis/shaft constituted by the shaft 120 until the hook 111 of the lock fastener 110 extend into and clutch the opening 107 of the data connector 104. The switch button 108 remains on the original position 122 of the securing piece 117 due to the recovery force of the elastomer 116 after deformation, and the extension component 109 of the switch button 108 will not contact with the incline surface 113 of the lock fastener 110. Moreover, the lock fastener 110 will lean against the data connector 104 and continually apply a force thereupon due to the recovery force of the elastomer 114 and thus the hook 111 can continually secure the data connector 104 at the opening 107 thereof. Therefore, the lock fastener 110 can secure the data connector 104 to maintain the retraction of the data connector 104 inside the signal transmission device 100.

Moreover, the signal transmission device 100 can further comprise a cover (not shown) to cover and protect the data connector 104 after the data connector 104 is retracted in the signal transmission device 100 to keep the signal transmission device 100 from exposing. The cover can be a soft rubber cover with one end attached to a side of the signal transmission device 100. With the protection of the soft cover, the data connector 104 can be extended out from the signal transmission device 100 if the user pushes the switch button 108 while the cover is also forced to open. The user can also open the cover before pushing the switch button 108. The user can put the cover on the data connector 104 after pressing and retracting the data connector 104.

The extendable signal transmission device of the invention comprises a switch button, a lock fastener and a data connector. Through elastically extendable design, the user can directly eject the data connector out via the switch button. When the user pushes the switch button, the lock fastener used to secure the data connector is moved aside to release and extend out the data connector from the portable electronic apparatus. When the user presses the data connector, the data connector can be retracted back into the portable electronic apparatus and secured and locked in the signal transmission device.

The invention provides an electrically extendable signal transmission device applicable to any portable electronic apparatus which needs additional transmission line to connect other electronic system for data transmission or battery recharge. The portable electronic apparatus which uses signal transmission device of the invention does not need additional transmission line to proceed data transmission and battery recharge. Through the built-in signal transmission device in the portable electronic apparatus, portable electronic apparatus can be directly connected to other systems such as personal computers or notebook personal computers without using additional transmission line and thus improves the convenience of usage of the portable electronic apparatus. Furthermore, the elastically extendable signal transmission device of the invention not only can improve the conveniences of carry, data transmission and battery recharge, but also can improve the convenience of operation of the portable electronic apparatus through a switch button to extend the data connector out.

Although specific embodiments have been illustrated and described, it will be appreciated by those skilled in the art that various modifications may be made without departing from the scope of the present invention, which is intended to be limited solely by the appended claims.

What is claimed is:
1. A signal transmission device, comprising:
a linked unit having a first shaft, a second shaft, a first elastomer and a second elastomer;
a switch button disposed on the linked unit;
a data connector rotating according to the first shaft and the first elastomer; and a lock fastener rotating according to the second shaft and the second elastomer;

wherein when the data connector is retracted in the signal transmission device, the lock fastener locks the data connector, and the data connector rotates and extends out via the switch button.

2. The signal transmission device of claim 1, wherein the lock fastener further comprises a hook for locking the data connector.

3. The signal transmission device of claim 1, wherein the switch button further comprises an extension part, the lock fastener further comprises an incline surface, and the extension part contacts the incline surface of the lock fastener and pushes the lock fastener to rotate after the switch button is stirred.

4. The signal transmission device of claim 1, wherein the first elastomer comprises a torsion spring.

5. The signal transmission device of claim 1, wherein the second elastomer comprises a torsion spring.

6. The signal transmission device of claim 1 further comprising a securing piece for the switch button moving thereon.

7. The signal transmission device of claim 6, wherein the securing piece has a track for the switch button to move between an original position and an activation position of the track.

8. The signal transmission device of claim 7 further comprising a third elastomer, wherein the third elastomer applies a force toward the original direction upon the switch button.

9. The signal transmission device of claim 8, wherein the third elastomer comprises a torsion spring.

10. A portable electronic apparatus, comprising:
a main frame; and
a signal transmission device in the main frame, comprising:
a linked unit having a first shaft, a second shaft, a first elastomer and a second elastomer;
a switch button disposed on the linked unit;
a data connector rotating according to the first shaft and the first elastomer; and
a lock fastener rotating according to the second shaft and the second elastomer;

wherein when the data connector is retracted in the signal transmission device, the lock fastener secures the data connector, and the data connector rotates and extends out via the switch button.

11. The portable electronic apparatus of claim 10, wherein the lock fastener further comprises a hook for securing the data connector.

12. The portable electronic apparatus of claim 10, wherein the switch button further comprises an extension component, the lock fastener further comprises an incline surface, and the extension component contacts the incline surface of the lock fastener and pushes the lock fastener to rotate after the switch button is stirred.

13. The portable electronic apparatus of claim 10, wherein the first elastomer and the second elastomer comprises a torsion spring respectively.

14. The portable electronic apparatus of claim 10 further comprising a cover disposed on the main frame to cover the data connector after the data connector is retracted in the signal transmission device.

15. The portable electronic apparatus of claim 14, wherein the cover with one end attached to a side of the signal transmission device.

16. The portable electronic apparatus of claim 14, wherein the cover is made of rubber.

17. The portable electronic apparatus of claim 10, wherein the linked unit further comprises a securing piece enabling the switch button moving thereon.

18. The portable electronic apparatus of claim 17, wherein the securing piece has a track with an original position and an activation position, the switch button moves between the original position and the activation position.

19. The portable electronic apparatus of claim 18, wherein the linked unit further comprises a third elastomer, the third elastomer applies a force toward the original direction upon the switch button.

20. The portable electronic apparatus of claim 19, wherein the third elastomer comprises a torsion spring.

* * * * *